United States Patent
Jang

(10) Patent No.: US 9,488,508 B2
(45) Date of Patent: Nov. 8, 2016

(54) INSTRUMENT PANEL WITH SHADOW POINTER

(71) Applicant: HYUNDAI MOTOR COMPANY, Seoul (KR)

(72) Inventor: Hyo Souk Jang, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 98 days.

(21) Appl. No.: 14/539,731

(22) Filed: Nov. 12, 2014

(65) Prior Publication Data

US 2015/0146405 A1    May 28, 2015

(30) Foreign Application Priority Data

Nov. 22, 2013   (KR) .................. 10-2013-0143260

(51) Int. Cl.
  *G01D 11/28*   (2006.01)
  *G01D 13/22*   (2006.01)
  *B60Q 3/04*    (2006.01)

(52) U.S. Cl.
  CPC .............. *G01D 13/22* (2013.01); *B60Q 3/04* (2013.01); *G01D 11/28* (2013.01)

(58) Field of Classification Search
  CPC ........ G01D 11/28; G01D 13/22; F21K 9/00; F21S 48/30; F21S 48/215; F21S 48/21; B60Q 3/00; B60Q 3/04; B60Q 3/042; B60Q 3/044; B60Q 3/06; F21W 2101/08
  See application file for complete search history.

(56) References Cited

U.S. PATENT DOCUMENTS

| | | | |
|---|---|---|---|
| 5,949,346 A * | 9/1999 | Suzuki | B60K 37/02 116/286 |
| 7,347,160 B2 * | 3/2008 | Honma | B60K 37/02 116/286 |
| 8,830,260 B2 * | 9/2014 | Ogasawara | G01D 7/00 345/619 |
| 2006/0050501 A1 | 3/2006 | Dyer | |

FOREIGN PATENT DOCUMENTS

JP    2011-180128 A    9/2011
KR    10-2011-0072486 A    6/2011

* cited by examiner

*Primary Examiner* — Bao Q Truong
(74) *Attorney, Agent, or Firm* — McDermott Will & Emery LLP

(57) ABSTRACT

An instrument panel with a shadow pointer includes a fixed pointer disposed at a predetermined position on a character board. A plurality of characters are arranged along a peripheral line of the character board at a predetermined distance from the fixed pointer. A plurality of light sources are arranged on the peripheral line and spaced apart from each other. The light sources radiate light to the fixed pointer. A shadow pointer is formed by a corresponding light source among the plurality of light sources. The shadow pointer points toward a position on the peripheral line.

11 Claims, 3 Drawing Sheets section A-A section A-A

INSTRUMENT PANEL WITH SHADOW POINTER

CROSS-REFERENCE TO RELATED APPLICATION

This application claims the benefit of priority to Korean Patent Application No. 10-2013-0143260 filed in the Korean Intellectual Property Office on Nov. 22, 2013, the entire contents of which are incorporated herein by reference.

TECHNICAL FIELD

The present disclosure relates to an instrument panel with a shadow pointer which has a new structure, and can reduce the number of parts and the assembly cost by showing speed, etc. to a driver with the pointer.

BACKGROUND

In general, an instrument panel, which provides information on a vehicle speed, RPM, a water temperature, and the amount of fuel etc. to a driver, is mounted on the front of an instrument cluster ahead of the driver in a vehicle.

The vehicle speed, RPM, the water temperature, and the amount of fuel etc. on the instrument panel can be read by pointers provided on the instrument panel.

The instrument panel is equipped with background lights therein so that a driver or passengers can easily see numbers showing the current state through the pointers when driving at night.

The instrument panel needs a switch and a motor for turning on the pointers, and a light source for lighting the pointers. Therefore, the number of parts increases, and the assembly cost may increase accordingly.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide an instrument panel with a shadow pointer which can reduce the number of parts operating pointers to provide information to a driver such as speed, etc. and can decrease the assembly cost.

According to an exemplary embodiment of the present disclosure, an instrument panel with a shadow pointer includes a fixed pointer disposed at a predetermined position on a character board. A plurality of characters are arranged along a peripheral line of the character board at a predetermined distance from the fixed pointer. A plurality of light sources are arranged opposite on the peripheral line and spaced apart from each other. The light sources radiate light to the fixed pointer. A shadow pointer is formed by a corresponding light source among the plurality of light sources. The shadow pointer points toward a position on the peripheral line.

The peripheral line and the character board may be circular.

The fixed pointer may be disposed at the center of the character board.

The light sources may be arranged along a circle at a predetermined distance from the fixed pointer.

The light sources may be light emitting diodes (LEDs).

As light sources sequentially radiate the light to the fixed pointer, the characters may be sequentially indicated.

Each of the plurality of characters may represent a speed of a vehicle.

The characters may be disposed on an upper side of the character board. The fixed pointer may protrude downwardly from a lower side of the character board. The light sources may spaced apart at a predetermined distance from the lower side of the character board to radiate the light to the fixed pointer. The shadow pointer may extend toward the corresponding character.

The character board may be a translucent plate that transmits a portion of light from the light sources.

According to the present disclosure, since a shadow is formed by light sources such as LEDs and a fixed pointer, and the shadow pointer replaces the existing pointers, a motor or gears for moving the existing pointers can be eliminated, such that it is possible to reduce the number of parts and the cost.

Further, it is flexible in terms of designing of a pointer, using the fixed pointer.

DETAILED DESCRIPTION

An exemplary embodiment of the present disclosure will hereinafter be described in detail with reference to the accompanying drawings.

Figure 1:
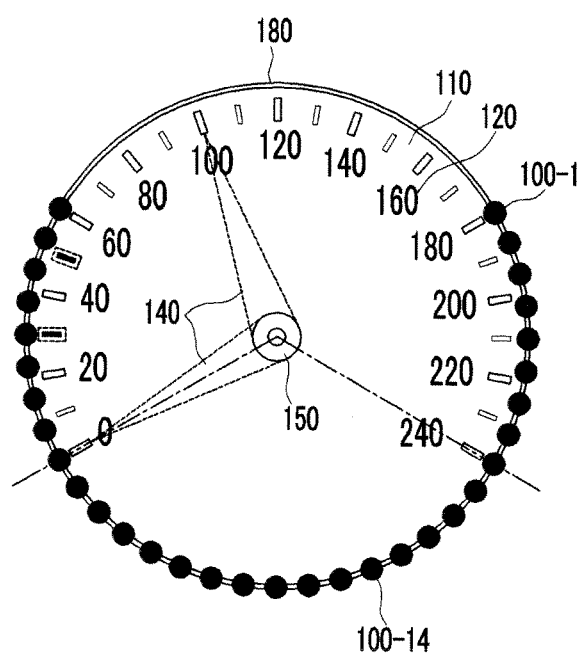
FIG. 1 is a schematic front view of an instrument panel with a shadow pointer according to an exemplary embodiment of the present disclosure.

FIG. 1 is a schematic front view of an instrument panel with shadow pointers according to an exemplary embodiment of the present disclosure.

Referring to FIG. 1, an instrument panel with a shadow pointer includes a character board 110, characters 120, a light source 100, a fixed pointer 150, and a shadow section 140. There is a plurality of light sources, including a first light source 100-1 to a fourteenth light source 100-14.

The fixed pointer 150 is disposed at the center of the character board 110, and the characters 120 are arranged along a circular line 180 around the fixed point 150. The light sources 100 are disposed along the circular line 180.

As shown in the figure, the characters 120 include 0, 20, 40, 60, 80, 100, 120, 140, 160, 180, 200, 220, and 240 and may represent a speed (km/h).

The light sources 100 may be LEDs, and when the first light source 100-1 of the light sources 100 radiates light to the fixed pointer 150, the shadow section 140 is formed on '0' of the character board 110, indicating the speed of the vehicle to be 0 to a driver.

When the fourteenth light source 100-14 of the light sources 100 radiates light to the fixed pointer 150, the shadow section 140 is formed on '100' of the character board 110, indicating the speed of the vehicle to be 100 to the driver.

As the first light source 100-1 to the fourteenth light source 100-14 sequentially radiate light, the shadow section 140 can sequentially move from '0' to '100'. Accordingly, the driver can easily see the speed of the vehicle by the position of the characters indicated by the shadow section 140.

Figure 2:
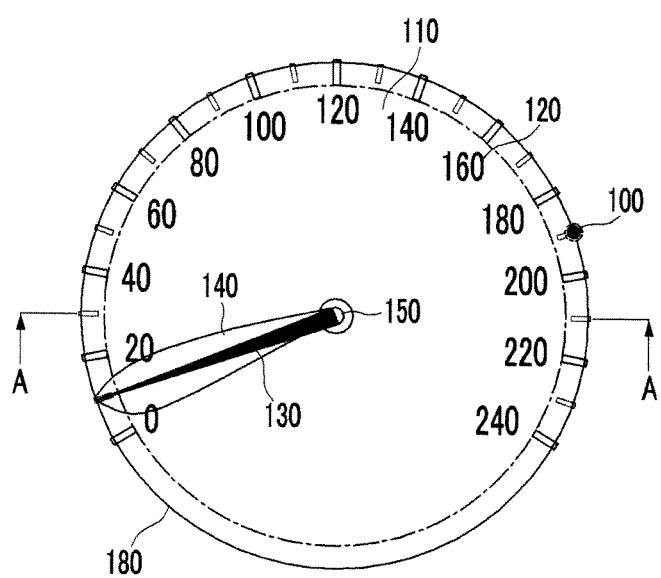
FIG. 2 is a plan view showing a shape of a shadow pointer in the instrument panel with the shadow pointer according to an exemplary embodiment of the present disclosure.

FIG. 2 is a plan view showing a shape of a shadow pointer in the instrument panel with the shadow pointer according to an exemplary embodiment of the present disclosure.

Referring to FIG. 2, when one of the light sources 100 radiates light to the fixed pointer 150, the shadow section 140 is formed on an opposite side of the light source 100, and a dark shadow pointer 130 is formed at a center of the shadow section 140.

The shadow section 140 includes both a light portion from the light source 100 and a shadow portion, while the shadow pointer 130 is the shadow portion in the shadow section 140.

In an exemplary embodiment of the present disclosure, an end of the shadow pointer 130 is close to or reaches the circular line 180, and the characters 120 may be disposed inside or outside the circular line 180.

Figure 3:
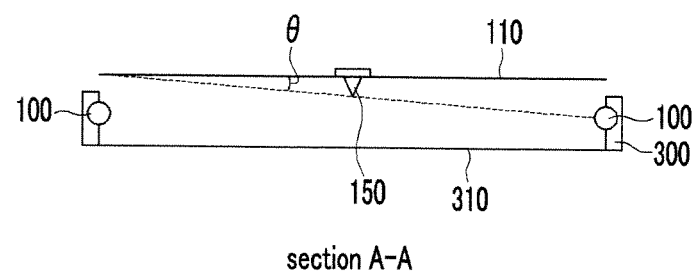
FIG. 3 is a cross-sectional view taken along line A-A of FIG. 2 and showing a structure of a fixed pointer and a light source in the instrument panel with the shadow pointer.

FIG. 3 is a cross-sectional view taken along line A-A of FIG. 2 and showing a structure of a fixed pointer and a light source in the instrument panel with a shadow pointer.

Referring to FIG. 3, then instrument panel with the shadow pointer includes the character board 110, the fixed pointer 150, a printed circuit board (PCB) 310, the light source 100, and a support 300.

The character board 110 is disposed above the fixed pointer 150 which protrudes downward from the center of the character board 110, and the PCB 310 is disposed at a predetermined distance under the characters board 110.

The support 300 protrudes upwardly from the edge of the PCB 310, and the light source is disposed on the inner side of the support 300.

The light source 100 radiates light to the fixed pointer 150, and the shadow section 140 and the shadow pointer 130 are formed on the character board 110 by the fixed pointer 150.

As shown in FIG. 3, the light source 100 radiates light at a predetermined angle θ to the character board 110, and the shadow pointer 130 formed by the fixed pointer 150 is extended toward the characters 120 on the character board 110 which is a translucent plate that transmits a portion of light from the light sources.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. An instrument panel, comprising:
a fixed pointer disposed at a predetermined position on a character board;
a plurality of characters arranged along a peripheral line of the character board at a predetermined distance from the fixed pointer;
a plurality of light sources arranged on the peripheral line and spaced apart from each other, the light sources radiating light to the fixed pointer; and
a shadow pointer formed by a corresponding light source among the plurality of light sources, the shadow pointer formed on the character board by a shadow section formed opposite the corresponding light source and pointing toward a position on the peripheral line.
2. The instrument panel of claim 1, wherein the peripheral line is circular.
3. The instrument panel of claim 2, wherein the fixed pointer is disposed at the center of the character board.
4. The instrument panel of claim 2, wherein the light sources are arranged along the circular peripheral line at a predetermined distance from the fixed pointer.
5. The instrument panel of claim 4, wherein the light sources are light emitting diodes (LEDs).
6. The instrument panel of claim 1, wherein as the light sources sequentially radiate the light to the fixed pointer, the characters are sequentially indicated.
7. The instrument panel of claim 1, wherein each of the plurality of characters represents a vehicle speed.
8. The instrument panel of claim 1, further comprising:
a printed circuit board (PCB) disposed below the character board at a predetermined distance; and
a plurality of supports protruding upwardly from the edge of the PCB,
wherein the light sources are disposed on an inner side of the supports.
9. The instrument panel of claim 8, wherein:
the characters are disposed on an upper side of the character board,
the fixed pointer protrudes downwardly from a lower side of the character board toward the PCB,
the light sources are spaced apart at a predetermined distance from the lower side of the character board to radiate the light to the fixed pointer, and
the shadow pointer extends toward the position on the peripheral line.
10. The instrument panel of claim 1, wherein the character board is a translucent plate that transmits a portion of light from the light sources.
11. The instrument panel of claim 9, wherein the shadow section includes a light portion from the light sources and a shadow portion, and
wherein the shadow pointer is the shadow portion.

\* \* \* \* \*